United States Patent [19]

Block

[11] Patent Number: 4,666,614

[45] Date of Patent: May 19, 1987

[54] DISPERSIBLE ALPHA ALUMINA MONOHYDRATE

[75] Inventor: Jacob Block, Rockville, Md.

[73] Assignee: W. R. Grace & Co., New York, N.Y.

[21] Appl. No.: 658,128

[22] Filed: Oct. 5, 1984

Related U.S. Application Data

[63] Continuation-in-part of Ser. No. 391,112, Jun. 23, 1982, abandoned.

[51] Int. Cl.$^4$ ........................... C09K 7/00; C01F 7/02; B01J 13/00
[52] U.S. Cl. ................................ 252/8.512; 252/8.511; 252/315.7; 423/629
[58] Field of Search ............... 252/315.7, 8.511, 8.512; 423/625, 626, 629

[56] References Cited

U.S. PATENT DOCUMENTS

| | | | |
|---|---|---|---|
| 3,630,670 | 12/1971 | Bell et al. .......................... | 423/626 |
| 3,739,062 | 6/1973 | Barsotti .............................. | 423/625 |
| 3,975,509 | 8/1976 | Royer ................................. | 423/626 |
| 4,055,509 | 10/1977 | Weimer .............................. | 252/315.7 X |
| 4,117,105 | 9/1978 | Hertzenberg ...................... | 252/313 R X |
| 4,240,915 | 12/1980 | Block ................................. | 252/8.5 B |
| 4,244,835 | 1/1981 | Block ................................. | 252/313 R |
| 4,313,923 | 2/1982 | Block et al. ....................... | 423/628 |
| 4,492,682 | 1/1985 | Trebillon ........................... | 423/626 |
| 4,584,108 | 4/1986 | Block ................................. | 252/8.5 B |

FOREIGN PATENT DOCUMENTS

| | | | |
|---|---|---|---|
| 1246697 | 8/1967 | Fed. Rep. of Germany ...... | 423/625 |
| 1381282 | 11/1964 | France ............................... | 423/625 |
| 1065733 | 4/1967 | United Kingdom ............... | 423/625 |

Primary Examiner—John F. Terapane
Assistant Examiner—Virginia B. Caress
Attorney, Agent, or Firm—Edward J. Cabic

[57] ABSTRACT

An alpha alumina monohydrate, AlO(OH), powder is produced which is capable of readily dispersing in aqueous solutions to yield a shear-rate thinning mixture. The alpha alumina monohydrate is made by reacting an acid reactant and a base reactant, wherein at least one contains aluminum, in an aqueous medium in proportions to yield a solution having a pH of from about 7.5 to 10. Then the mixture is given the unique heat treatment at a temperature of from about 60° to 100° C. for a period of from about 2 to 7 hours. The excess water is removed from the product such as by filtration. The solid can be optionally washed to remove by-product salts. The solid product can be readily redispersed in water to yield a shear-rate thinning liquid without the aid of any further acid or base or the use of excessive high shear mixing. The solid product can be further dried to recover a solid product with greater than 10% AlO(OH) and even greater than 35% AlO(OH).

16 Claims, No Drawings

DISPERSIBLE ALPHA ALUMINA MONOHYDRATE

This application is a continuation-in-part application of U.S. application Ser. No. 391,112, filed Jun. 23, 1982, now abandoned.

BACKGROUND OF THE INVENTION

1. Field of the Invention

This invention relates to an improved process to make a novel form of a alpha alumina monohydrate powder useful as a shear-rate thinning material in drilling fluids.

2. Description of the Previously Published Art

U.S. Pat. No. 4,240,915 to Block describes water-based, clay-free drilling fluids for use in drilling bore holes into subterranean formations which contain water, a water-loss inhibitor, a weighting agent and aluminum hydroxide as a viscosifying agent. The aluminum hydroxide viscosifying agent is prepared in an aqueous medium by contacting and mixing under a high degree of agitation an acid reactant and a base reactant wherein at least one of the acid or base reactants contains aluminum. The acidic reactant can be either an inorganic acid or a salt of a strong acid and a weak base. These aqueous compositions contain a significant amount of water and are expensive to transport.

To reduce the water weight, attempts have been made to dry the aluminum hydroxide. However, when it is dried, the aluminum hydroxide powder does not readily disperse back into water to yield the original shear-rate thinning material. Thus this dried form would not be suitable for its intended use at a well site where it should be able to disperse in water to form a shear-rate thinning drilling fluid.

U.S. Pat. No. 4,244,835 to Block describes one way to solve this problem of redispersing the dried aluminum hydroxide powder in water. There it was necessary to add a base such as a water soluble alkali metal hydroxide, carbonate or oxide to the mixture and it was further necessary to employ high shear mixing. This technique, however, not only requires the presence of additional chemicals which increase the cost of the drilling fluid but it also requires high shear mixing. In addition the handling of the caustic is hazardous and it may result in the pH of the reaction mixture being too high which would then require readjusting with an acidic material.

3. Objects of the Invention

It is an object of this invention to produce a solid alpha alumina monohydrate powder which can readily be dispersed in water to yield a highly shear-rate thinning fluid without the aid of large quantities of acids, bases or excessive high shear mixing.

It is an object of this invention to produce a dried alpha alumina monohydrate powder containing an aluminum compound which when expressed as AlO(OH) is at least about 10% by weight. Such a dried powder can be readily dispersed in water to yield a highly shear-rate thinning fluid with an n value in the power law model to be discussed below of less than 0.3 without the aid of large quantities of acids, bases or excessive high shear mixing.

It is a further object of this invention to form a shear-rate thinning alpha alumina monohydrate in an aqueous system by reacting under a high degree of agitation an acid reactant and a base reactant wherein at least one of the acid or base reactants contains aluminum and to then utilize a special thermal treatment to produce a unique alpha alumina monohydrate form of aluminum hydroxide which can be subsequently dried to a low water content and then easily redispersed in water to form a shear-rate thinning material without the need for any large quantities of auxiliary dispersing agents or any expensive high shear mixing equipment.

It is a further object of this invention to produce an aluminum hydroxide viscosifying material which can be dried to a greater extent than ordinarily produced alpha alumina monohydrate.

These and further objects will become apparent as the description of the invention proceeds.

SUMMARY OF THE INVENTION

Heat treatment of an AlO(OH) gel prior to filtration produces a form of alpha alumina monohydrate which can be recovered and optionally dried and which later readily redisperses to yield a shear-rate thinning material. The form of alpha alumina monohydrate described herein is also known as boehmite or pseudoboehmite.

A shear-rate thinning gel is prepared in the preferred form by mixing sodium aluminate and aluminum chloride either as solutions or as solids which are added to water and combined together with high-speed mixing. The proportions are chosen so as to yield a product having a pH between about 7.5 and about 10.0. Then according to the present invention, the reaction product is heated to a temperature of from about 60° C. to about 100° C. for about 2-7 hours, and then a moist solid product is recovered such as by filtering. If desired, the moist product can be washed with water to remove any by-product salts. This moist product can be used directly as a viscosifying agent. It has superior rheological properties compared to a similar product which has not been given the heat treatment.

The solid product, which can be in the form of a filter cake, can also be dried to form a free flowing powder product containing at least about 10% AlO(OH). Upon further drying, more preferred products contain more than about 20% AlO(OH) and for the most economical shipping costs, more than about 35% AlO(OH). The product is characterized as containing AlO(OH) for convenience of expression, especially since upon heating most of the material is in the boehmite or pseudoboehmite form. There is essentially no trihydrate present such as gibbsite or bayerite. Since there may be some aluminum present in a compound form other than boehmite or pseudoboehmite, the amount of the aluminum present is being expressed by taking the aluminum in the various compounds and expressing it as alpha alumina monohydrate having the formula AlO(OH). The dried product can be readily redispersed in water to its original shear-rate thinning gel form.

DESCRIPTION OF THE PREFERRED EMBODIMENTS

When alpha alumina monohydrate, AlO(OH), is produced by reacting an acid reactant and a base reactant, superior rheological properties in the resulting reaction product can be obtained by heating the reaction product in the aqueous reaction slurry at a temperature of from about 60° C. to about 100° C. for about 2-7 hours. The heat-treated reaction product can be recovered by filtration and the moist product as filtered can be used directly as a viscosifying agent since it has superior rheological properties as compared to a similar product which has not been given the heat treatment. The filtered reaction product can also be dried to make it into a free flowing powder. Such a product is obtained, for example, when the material is dried to an AlO(OH) level of 10%. Further drying to higher levels of AlO(OH) is possible such as more than 20% AlO(OH) or even more than 35% AlO(OH) when the excess water is not desired.

In the past alpha alumina monohydrate which is suitable for subsequent dispersion in an aqueous drilling fluid has been dried to a relatively moist powder having only about a 20% AlO(OH) concentration with the remaining 80% water and by-product salts. These products, however, do not have the superior rheological properties of the heat treated product of the present invention. If the prior art powder were dried to a significantly higher alpha alumina monohydrate concentration, it could not be later dispersed in water to serve as an effective viscosifying agent. For these relatively moist 20% alpha alumina monohydrate powder compositions, the weight of the water and salt is four times as much as is the weight of the alpha alumina monohydrate. In other words, the weight of water and salt is 400% of the weight of the alpha alumina monohydrate present.

This is a very appreciable amount of water. When one wishes to reduce shipping costs, it is desirable to be able to further decrease the water content while still yielding an alpha alumina monohydrate powder which can be readily dispersed in water. By subjecting the aluminum hydroxide to the thermal treatment according to the present invention it is possible to further dry the alpha alumina monohydrate powder so as to significantly reduce the water content while still having a powder which can be redispersed in water as an effective viscosifying agent and still maintain shear-rate thinning properties after being subjected to bottom hole temperatures of 250° F. or greater.

If one merely dries a moist alpha alumina monohydrate filter cake which has not been given the heat treatment according to the present invention to significantly reduce its water content and form a powder such as with an AlO(OH) content of 30% or greater, such a powder will not be redispersible in water without the aid of additional dispersing agents. On the other hand, if the moist alpha alumina monohydrate made according to the present invention is substantially dried, it is possible to obtain a redispersible alpha alumina monohydrate powder where the AlO(OH) content is 30% or greater.

The alpha alumina monohydrate agent found useful is substantially water-insoluble. It forms a shear-rate thinning dispersion in aqueous systems. Further, the subject alpha alumina monohydrate agent possesses a definite characterizing x-ray diffraction spectrum having a major characterizing diffraction peak at 6.11–6.80 Angstrom units depending on whether the product is in the pseudoboehmite or boehmite form. Pseudoboehmite has a characteristic X-ray diffraction peak between about 6.15–6.80 angstroms, and is formed by heating at the lower temperatures and shorter times such as for 2 hours at 60° C. Longer heating time and/or higher temperatures result in boehmite having a characteristic x-ray diffraction peak at 6.11 angstrom units. The spectrum is determined by standard techniques using the K-alpha doublet of copper as the radiation source.

Conventional alpha alumina monohydrate powders such as Catapal TM made by Conoco only disperse in water with difficulty to form a viscosifying agent. These conventional powders require high shear or strong acids or bases as dispersing agents. The thermally treated alpha alumina monohydrate according to the present invention can be dispersed easily without excessive high shear or strong acids or bases. The aqueous suspensions or dispersions of the thermally treated alpha alumina monohydrate agent of the present invention having the above-described x-ray characterization are capable of imparting non-Newtonian, pseudoplastic properties to the aqueous system. The alpha alumina monohydrate agent can be initially formed in known manners under substantially basic conditions. It is then given the unique thermal treatment according to the present invention. The agent has hydroxyl groups as an integral part of the agent's composition including bound water of hydration.

Various methods are well known to form the desired agent. It has been found that due to the amphoteric nature of aluminum, the alpha alumina monohydrate agent of the present invention can be formed by contacting an aqueous solution or suspension of an acidic or basic aluminum containing precursor material with a neutralizing agent or wherein both an acid precursor and a base precursor are reacted together. The order of addition is not important; the reactants can be added in any order or simultaneously.

The basic precursor material can be an alkali metal aluminate which is contacted with a sufficient amount of an acidic agent such as inorganic mineral acid, as for example sulfuric, hydrochloric, nitric and the like, and preferably hydrochloric, or a salt of a strong acid and a weak base to cause the pH of the solution to be reduced to within the ranges described further and to thereby convert the aluminate to the alpha alumina monohydrate agent used in the present invention. The acid can be used in slight excess and then back titrated with a base to the desired pH to assure conversion of the precursor to the hydroxide. The aluminate precursor can be any commercially available alkali metal aluminate or the aluminate can be obtained by conventional techniques such as by the action of a base on aluminum or aluminum oxide. The aluminate normally will have an alkali metal oxide to aluminum oxide mole ratio of from about 1:1 to 2:1.

Suitable acidic precursor materials for forming the alpha alumina monohydrate agent are water-soluble, acidic aluminum salts such as aluminum halides, preferably aluminum chloride, as well as aluminum sulfate, aluminum nitrate and the like. Aqueous solutions of these precursor materials can be contacted with a sufficient amount of water-soluble base, such as an alkali metal hydroxide as, for example, sodium hydroxide, potassium hydroxide and the like or ammonium hydroxide to cause the resultant aqueous system to have a pH within the range described below and to thereby form the desired aluminum hydroxide agent. The base should be used in an amount such that the final pH is between about 7.5 to 10.

The desired alpha alumina monohydrate agent can also be formed from an acidic aluminum precursor material such as a water-soluble acidic aluminum salt as described above with a basic aluminate as described above by contacting the precursory materials in an aqueous system in suitable ratios to cause the resultant system to have a pH within the range described below.

The aluminum hydroxide agents should be formed in an aqueous system which has a pH above about 7.5 to about 10 and preferably a pH of from about 8 to about 9.5. The drilling fluids formed with such aqueous systems having a pH within the range of about 8 to about 10.3 and preferably between about 9 to 10 exhibit the desired properties of viscosity and non-Newtonian pseudoplasticity.

The alpha alumina monohydrate agent can be formed in an aqueous system. The acidic or basic precursor material can be present in concentrations of from about 5 to 50 percent by weight based on the water present. The concentration can vary outside of this range, but should not be such as to inhibit the thorough mixing, preferably under high speed agitation, of the reactants during the formation of alpha alumina monohydrate viscosifying agent.

After the alpha alumina monohydrate has been made it is given the unique thermal treatment which will permit it to be later dried to a higher solids content. The thermal treatment consists of heating at temperatures of about 60° C. to about 100° C. for from about 2 to 7 hours. If the heating is conducted for too long a period the material becomes too crystalline and it looses its desirable rheological properties, e.g. it can no longer be subjected to treatment at 250° F. for 16 hours and still maintain desirable rheology.

The above-described thermally treated alpha alumina monohydrate is capable of yielding a clay-free, (the term "clay-free" when used herein refers to the absence of drilling fluid viscosifying clays as an essential agent of the fluid and not to other materials entrained therein) water-based drilling fluid (the term "fluid" or "system" when used herein refers to water containing the alpha alumina monohydrate agent of the subject invention in solution, suspension or dispersion) having suitable rheological properties of viscosity and non-Newtonian, pseudoplasticity, that is to say, that the viscosity of the resultant water-based drilling fluid varies inversely with respect to the shear-rate exerted on the fluid. The relationship of the shear stress with respect to shear-rate can be defined by the rheological power law model relationship of $\tau = K(\gamma)^n$ in which $\tau$ represents the shear stress exerted on the aqueous system of the drilling fluid in units such as pounds per 100 ft$^2$ or dynes/cm$^2$; $\gamma$ is the shear-rate in units of reciprocal time such as sec$^{-1}$; K is a constant having the value of the shear stress of the particular system at a shear-rate of 1 sec$^{-1}$; and n is a numerical value greater than zero. Water-based drilling fluids containing the presently described thermally treated alpha alumina monohydrate viscosifying agent exhibit shear stress ($\tau$) properties at varying shear-rates ($\gamma$) in the range of from about 10 to 400 sec$^{-1}$, that is, in the range normally encountered in the annular region of the bore hole, such that n of the power law relationship has a value of less than about 0.3. Such systems, therefore, exhibit non-Newtonian, pseudoplastic properties to an exceptionally high and desirable degree.

When plotting log shear stress on the ordinate versus log shear-rate on the abscissa of a graph, the slopes and intercepts provide useful information. At low shear-rates, such as from about 10 to about 400 sec$^{-1}$, as are encountered in the annular region of the bore hole, the shear stress should increase at a low rate with respect to the shear-rate exerted on the material which is observed as a low slope (or n value according to the power law relationship) of the curve. The lower the slope of n value within this region the more desirable the fluid. In certain instances the slope may continuously or segmentally change, but it should retain an n value of about 0.3 or less. At high shear-rates, such as above 50,000 sec$^{-1}$ as are found in the region of a drill bit in a drilling operation, the fluid should have a low viscosity, that is, approach the viscosity of water since this permits high drilling rates. At such viscosities the fluid approaches a Newtonian liquid and there is an increased slope of the curve with n having a value approaching or equal to unity. The value for K in the power law relationship is the shear stress value determined or extrapolated for a shear-rate of 1 sec$^{-1}$ and is equivalent to the viscosity of the aqueous system at 1 sec$^{-1}$.

In addition to presently finding that the thermally treated alpha alumina monohydrate agent imparts desired viscosity and pseudoplasticity to water-based drilling fluids it has been further found that this agent has excellent stability to temperature, calcium and sodium salts and various other conditions desired of a fluid used in rotary drilling of bore holes and the like. The drilling fluids containing the subject thermally treated alpha alumina monohydrate agent have been found to have high degrees of stability with respect to their rheological properties under various adverse conditions. Such fluids have been found to be stable after subjections to elevated temperatures for sustained periods of time, to high shear-rates such as are encountered at the site of the drill bit, as well as being stable in the presence of various corrosive elements such as calcium chloride, and sodium chloride which may be entrained in such fluids.

The high degree and breadth of stability of the presently achieved drilling fluid, when combined with its ability to exhibit non-Newtonian, pseudoplastic properties under varying low shear-rates of from about 10 to 400 sec$^{-1}$ and greater, such as are encountered in the annular region between the drill stem and the the bore hole wall, aids in increasing the drilling efficiency, that is, the rate of drilling the bore hole. Drilling fluids having concentrations of from about 0.5 to about 5 percent (and preferably 2 to 3 percent) active solids (as alpha alumina monohydrate) yield fluid systems which have the desired properties.

The drilling fluid composition can contain other conventional drilling fluid additives such as water loss inhibitors as, for example, polyanionic cellulose and the like or cross-linked polyvinyl alcohol as described in U.S. Pat. No. 4,349,443, the disclosure of which is incorporated herein by reference. The drilling fluid composition can also contain weighting agents as, for example, crushed oyster shells, barite, and the like.

The term "water-based" which is used herein in describing the present invention, generally includes drilling fluids which have a liquid base comprising substantially fresh water or salt water. However, it is to be realized that at times certain small amounts of other liquids may be emulsified or admixed with the water-based fluid. For example, drilling fluids may at times contain small amounts of oil, emulsified or admixed with the drilling fluid, the oil coming either from an oil formation drilled into or, under certain conditions, can be purposely added.

The presently described drilling fluids have several distinct advantages over fluids using conventional viscosifying agents, such as clays, Xanthan gums or synthetic organic polymers. The presently described drilling fluids have been found to be stable to various salts commonly found in drilling fluid compositions, while the commonly used clays, such as bentonite or attapulgite, are normally sensitive to the presence of such salts and lose their ability to impart viscosity to the fluids. Such clays should, therefore, not be used as a viscosifier component of the subject drilling fluids. Xanthan gums are also used as the viscosifying agents in drilling fluids, but have the disadvantage of being expensive and unstable at high temperature conditions. The presently described drilling fluids need not contain such heat sensitive viscosifier materials as xanthan gums and, therefore, can maintain their viscosity and pseudoplasticity after subjection to elevated temperatures as is normally encountered in bore holes. Synthetic organic polymers which are used as viscosifiers in drilling fluids are expensive and are only used under special application.

The present water-based, clay-free drilling fluids, having as their viscosifying agent the thermally treated alpha alumina monohydrate agent described above and having a pH within the range of from at least about 8 to 10.3, have been found to be stable to temperature, the presence of calcium and sodium salts and to the presence of conventional drilling fluids, are substantially non-corrosive and non-destructive to metal equipment commonly used in drilling operations.

This material can be used with conventional bore hole drilling equipment in manners known to those skilled in the art to efficiently and effectively drill bore holes into subterranean formations. The pseudoplastic properties of the present drilling fluid permits effective removal of the cuttings from the area at and around the drill bit to permit more efficient drilling of the formation.

Having described the basic aspects of our invention, the following examples are given to illustrate specific embodiments thereof.

EXAMPLE 1

This example illustrates the preparation of the alpha alumina monohydrate. Sodium aluminate (124.8 g. Nalco 680) was dissolved in 2800 g. of water. Then 99.2 g. of $AlCl_3 \cdot 6H_2O$ was added with high speed stirring. A gelatinous product was formed, and stirring was continued for 20 minutes. Stirring was then stopped, and the gel was allowed to set for about 16 hours. After re-shearing with high speed stirring, the pH was adjusted to 9.5 with $Na_2CO_3$ and the material was heated to about 80°–90° C., with stirring, for 6 hours. After heating, the rheology was measured with an n of 0.25 and a K of 5.2 obtained. The product was filtered and washed twice with 500 ml. of water each time. The cake was dried under vacuum at room temperature to a dry powder which had the following analysis: $Al_2O_3$, 40.1%; NaCl, 3.1%; total volatiles when heated to 1700° F., 57.0%. The material was ground and sieved through a U.S. standard 16 mesh screen. X-ray diffraction analysis showed that the product was alpha alumina monohydrate with a crystallite size of 35 Angstrom units.

EXAMPLE 2

This example illustrates the performance testing of the product prepared in Example 1.

A mixture of 4.2 parts of the product of Example 1 and 95.8 parts of water was mixed for 20 minutes with a Hamilton Beach mixer. The final mix contained 2.0% AlO(OH). After low-shear mixing for 4 hours with a propeller type stirrer the material was further mixed for 5 minutes with a Hamilton Beach mixer. The rheology was determined (Haake RV-3, with a MV-1 rotor) and the n was 0.30 and the K was 1.25. These values compare well to the original more concentrated AlO(OH) mix before filtering which had an AlO(OH) content of 3.1% and which had an n of 0.25 and a K of 5.2.

EXAMPLE 3

This example shows that a dried AlO(OH) product prepared without the heating step cannot alone be redispersed to yield a shear-rate thinning fluid.

An AlO(OH) gel was prepared as in Example 1, except that the heating step before filtration was omitted. The product was dried to only 25.5% $Al_2O_3$ instead of 40.1% as in Example 1. The product analysis was: $Al_2O_3$, 25.5%, NaCl, 2.5%; total volatiles when heated to 1700° F., 71.8%.

The product was treated as in Example 2 to give 2.0% AlO(OH) in water. The material did not redisperse, and the rheology was Newtonian since the n value was 1.

EXAMPLE 4

This example discloses the preparation of AlO(OH) materials which have been dried to a lesser level and compares them in performance with similarly made materials which have not been given the intermediate heating step.

The initial AlO(OH) gel was prepared by adding 158.9 g of 37.5% HCl to 1900 g $H_2O$ and mixing. Next 91.5 g $NaAlO_2$ solution (containing 20% $Al_2O_3$ with a $Na_2O$ to $Al_2O_3$ mole ratio of 1.5) was added and mixed for 2 hours. An additional 179 g of $NaAlO_2$ was then added with high speed mixing to a pH 9.0. Mixing was continued for 20 minutes. The sample was then aged for 2 hours, and re-mixed for 5 minutes. The final AlO(OH) concentration was 2.7%.

The AlO(OH) sample prepared was split into 2 equal portions, A and B. A was heated according to the present invention to 70° C. and maintained at that temperature for 5 hours with stirring. Sample B was a control which was stirred for 5 hours at ambient temperature. Both portions were then filtered, and the filter cakes analyzed. They were about the same except the heated Sample A had a larger crystallite size of 21 Angstrom units as measured by X-ray as compared to 17 Angstrom units for the unheated Sample B.

The filter cakes were dried in an oven at 60° C. until the AlO(OH) content was approximately 20% which corresponds to an $Al_2O_3$ value of about 17%.

Performance checks were run on each product by mixing enough sample in water to give an AlO(OH) content of 3%. Each was mixed for 20 minutes on a Hamilton Beach mixer, and the pH was adjusted to 9.5 with dilute NaOH. The rheological properties were determined after mixing overnight with propeller type stirrer at low speed. The performance results are summarized in Table 1.

TABLE 1

| Rheological Properties Of Re-Dispersed AlO(OH) | | | |
|---|---|---|---|
| Sample | Gel Heated | n | K (lb-sec/100 ft2) |
| A | Yes | 0.17 | 22.5 |
| B | No | 0.24 | 4.5 |

The results show that the gel heated material of Sample A had better rheological properties (higher K, lower n) than the control Sample B.

It is understood that the foregoing detailed description is given merely by way of illustration and that many variations may be made therein without departing from the spirit of this invention.

What is claimed is:

1. A process of producing a solid, alpha alumina monohydrate viscosifying agent containing an aluminum compound which when expressed as AlO(OH) is present in at least about 35 percent by weight and which is redispersible in water to produce a shear-rate thinning liquid comprising
   (a) contacting and mixing in an aqueous medium under a high degree of agitation an acid reactant and a base reactant wherein at least one of the acid or base reactants contains alumnium in proportions to yield a solution having a pH of from about 7.5 to 10;
   (b) heating the mixture at a temperature of from about 60° C. to about 100° C. for a period of from about 2 to about 7 hours;
   (c) recovering a moist solid product; and
   (d) drying the moist solid product so that it has an AlO(OH) content of more than about 35 weight percent based on the total weight of product.

2. A process according to claim 1, further comprising washing the recovered product to remove by-product salts.

3. A process according to claim 1, wherein the acid reactant is aluminum halide and the base reactant is an alkali metal aluminate.

4. A process according to claim 1, wherein the acid reactant is hydrochloric acid and the base reactant is sodium aluminate.

5. A process according to claim 1, wherein the acid reactant is hydrochloric acid and the base reactant is potassium aluminate.

6. A process according to claim 1, wherein the moist solid product is recovered by filtration.

7. A dried alpha alumina monohydrate viscosifying agent made by the process of claim 1, which on redispersion in water forms a shear-rate thinning liquid with an n value in the power law model of less than 0.3.

8. A dried alpha alumina monhydrate viscosifying agent made by the process of claim 2, which on redispersion in water forms a shear-rate thinning liquid with an n value in the power law model of less than 0.3.

9. A dried alpha alumina monohydrate viscosifying agent made by the process of claim 3, which on redispersion in water forms a shear-rate thinning liquid with an n value in the power law model of less than 0.3.

10. A dried alpha alumina monohydrate viscosifying agent made by the process of claim 4, which on redispersion in water forms a shear-rate thinning liquid with an n value in the power law model of less than 0.3.

11. A dried alpha alumina monohydrate viscosifying agent made by the process of claim 5, which on redispersion in water forms a shear-rate thinning liquid with an n value in the power law model of less than 0.3.

12. In the process of drilling a bore hole into a subterranean formation using conventional bore hole drilling equipment, the improvement comprising forming a drilling fluid by mixing the dried alpha alumina monohydrate of claim 7 in water and circulating said drilling fluid in the bore hole while drilling.

13. In the process of drilling a bore hole into a subterranean formation using conventional bore hole drilling equipment, the improvement comprising forming a drilling fluid by mixing the dried alpha alumina monohydrate of claim 8 in water and circulating said drilling fluid in the bore hole while drilling.

14. In the process of drilling a bore hole into a subterranean formation using conventional bore hole drilling equipment, the improvement comprising forming a drilling fluid by mixing the dried alpha alumina monohydrate of claim 9 in water and circulating said drilling fluid in the bore hole while drilling.

15. In the process of drilling a bore hole into a subterranean formation using conventional bore hole drilling equipment, the improvement comprising forming a drilling fluid by mixing the dried alpha alumina monohydrate of claim 10 in water and circulating said drilling fluid in the bore hole while drilling.

16. In the process of drilling a bore hole into a subterranean formation using conventional bore hole drilling equipment, the improvement comprising forming a drilling fluid by mixing the dried alpha alumina monohydrate of claim 11 in water and circulating said drilling fluid in the bore hole while drilling.

* * * * *